United States Patent
Bharghavan et al.

(10) Patent No.: US 8,903,320 B1
(45) Date of Patent: Dec. 2, 2014

(54) OPERATING WIRELESS COMMUNICATION SYSTEMS IN CLOSE PROXIMITY

(75) Inventors: Vaduvur Bharghavan, Morgan Hill, CA (US); Mohan Ram, Banashankari (IN)

(73) Assignee: Meru Networks, Sunnyvale, CA (US)

( * ) Notice: Subject to any disclaimer, the term of this patent is extended or adjusted under 35 U.S.C. 154(b) by 849 days.

(21) Appl. No.: 12/978,207

(22) Filed: Dec. 23, 2010

Related U.S. Application Data

(60) Provisional application No. 61/291,280, filed on Dec. 30, 2009.

(51) Int. Cl.
*H04B 15/00* (2006.01)

(52) U.S. Cl.
USPC ............ 455/63.1; 455/296; 370/201; 370/252

(58) Field of Classification Search
USPC ......... 370/201, 229, 236, 241, 242, 252, 310, 370/317, 328; 455/501, 63.1, 67.13, 296
See application file for complete search history.

(56) References Cited

U.S. PATENT DOCUMENTS

| | | | |
|---|---|---|---|
| 2004/0166864 A1* | 8/2004 | Hill et al. | 455/450 |
| 2010/0130133 A1* | 5/2010 | Lou et al. | 455/63.1 |
| 2010/0178875 A1* | 7/2010 | Oh et al. | 455/63.1 |
| 2010/0284333 A1* | 11/2010 | Shirota et al. | 370/328 |
| 2011/0128846 A1* | 6/2011 | Hong et al. | 370/230 |
| 2011/0143674 A1* | 6/2011 | Lim et al. | 455/63.1 |

* cited by examiner

*Primary Examiner* — Kwang B Yao
*Assistant Examiner* — Nguyen Ngo
(74) *Attorney, Agent, or Firm* — Law Office of Dorian Cartwright

(57) ABSTRACT

A method wherein a message packet is received at a node in a $1^{st}$ wireless communication system, wherein said $1^{st}$ wireless communication system determines whether it is experiencing interference with a $2^{nd}$ wireless communication system, and wherein said $1^{st}$ wireless communication system takes action to reduce said interference. Reducing said interference might include reduction in signal strength, change in message coding, and other actions, in response to a set of selected interference thresholds. Different protocol effects might be changed in response to one or more said thresholds, with the effect that distinct wireless communication systems may operate in relatively close proximity with a minimum of interference.

15 Claims, 2 Drawing Sheets

OPERATING WIRELESS COMMUNICATION SYSTEMS IN CLOSE PROXIMITY

CROSS REFERENCE TO RELATED PROVISIONAL APPLICATION

This application claims priority from Provisional Application No. 61/291,280, entitled "Method for Operating Wireless Devices in Close Proximity," filed Dec. 30, 2009, in the name of the same inventors. The Provisional Application is hereby incorporated by reference as if fully set forth herein.

BACKGROUND

In wireless communication systems, devices can send and receive messages without being physically coupled. Wireless stations can include portable computers, telephones, location sensors (such as those using GPS), and other devices. Portable computers with wireless communication capability can be coupled to a computer network, such as the Internet or the World Wide Web. The IEEE 802.11 standards (including such protocol standards as IEEE 802.11a, IEEE 802.11b, IEEE 802.11g, and IEEE 802.11n) include at least some known techniques for coupling wireless stations to a computer network. In the IEEE 802.11 standards, wireless stations seek out and select access points (herein sometimes called "AP's" in the plural case, or "AP" in the singular case). In the IEEE 802.11 protocol standards, each wireless device generally associates itself with a particular AP, with which it proceeds to communicate. Each wireless device (which might be mobile) determines from time to time if it has good communication with its associated AP, and whether it would have better communication with a different AP, and in the latter case, transfers its communication to the latter AP.

While these known methods generally achieve the goal of providing wireless communication systems, they suffer from at least the drawback that when a $1^{st}$ and a $2^{nd}$ wireless communication system operate in proximity, it is possible for those multiple wireless communication systems to interfere with each other. When a $1^{st}$ wireless communication system is located near a $2^{nd}$ wireless communication system, it is possible that one or more AP's in the $1^{st}$ wireless communication system, in their attempts to communicate with wireless stations in the $1^{st}$ wireless communication system, will generate wireless signals that will interfere with operation of one or more AP's in the $2^{nd}$ wireless communication system. This might occur, for example, when one household or business sets up a wireless communication system near another household or business that already has a wireless communication system. For example, in a crowded business neighborhood, it might occur that quite a few individual businesses desire to set up wireless communication systems for their own use. These might have the untoward effect of interfering, to the detriment of all of them.

SUMMARY OF THE DISCLOSURE

Technologies disclosed herein include methods, systems, and physical media, including techniques in which message packets are (1) received within the purview of a $1^{st}$ wireless communication system, such as an access point; (2) determined whether those message packets are from one or more wireless stations part of the access point's network, and if they are not, (3) altering a signal strength when transmitting packets to reduce the effect on wireless stations in a $2^{nd}$ wireless communication system, such as for example a nearby wireless network. A revised signal strength might be determined in response to one or more of several selected thresholds. Different protocol effects may also be changed as a result of those thresholds, with the effect that $1^{st}$ and $2^{nd}$ wireless communication systems can operate in close proximity with a relative minimum degree of interference.

DETAILED DESCRIPTION

Generality of Invention

Figure 1:
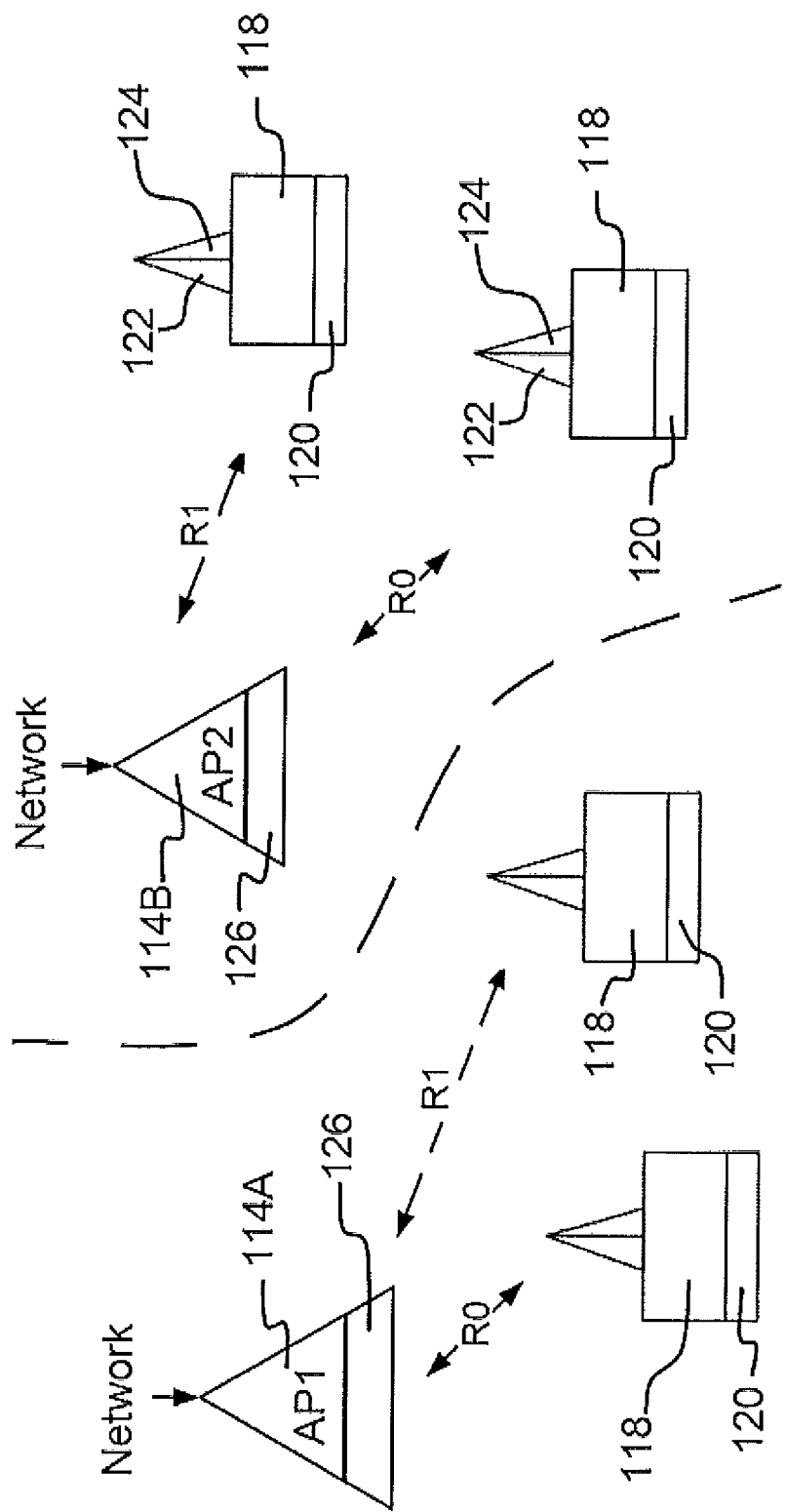
FIG. 1 shows a conceptual diagram of an arrangement including multiple wireless communication systems, each possibly including either fixed wireless stations, mobile wireless stations, or both.

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

DEFINITIONS

The phrase "access point", the term "AP", variants thereof, and the like, generally refer to devices capable of wireless communication with wireless stations and capable of either wired or wireless communication with other devices. In preferred embodiments, AP's communicate with external devices using an L2/L3 network. However, in the context of the invention, there is no particular requirement that AP's have an actual wired communication link; AP's might communicate entirely wirelessly.

The phrases "incoming message" and "received frame" generally refer to a message packet or message frame sent by a wireless device or wireless station to an AP. In the preferred embodiment these phrases refer to a frame sent by a wireless station to an AP under 802.11 wireless communication standards. The incoming message may be a unicast frame (intended for a single AP) or a multicast frame (intended for multiple AP's).

The phrases "outgoing message" and "transmit frame" generally refer to a message packet or message frame being sent to a wireless device or wireless station from an AP. In the preferred embodiment these phrases refer to a frame sent by an access point to a wireless device under 802.11 wireless communication standards. The outgoing message may be a unicast frame or a multicast frame.

The phrase "wireless communication" and the like, generally refers to radio frequency or other electromagnetic communication. In preferred embodiments, wireless communication includes a wireless communication standard such as IEEE 802.11a, 11b, 11g, or 11n. However, in the context of the invention, there is no particular requirement that wireless communication or a communication network must necessarily (1) use radio spectrum, (2) use electromagnetic communication, or even (3) be entirely confined to untethered communication coupling.

The phrases "wireless device", "wireless station", "mobile station" and the like, generally refer to devices capable of wireless communication with AP's. In preferred embodiments, wireless stations implement a wireless communication standard such as IEEE 802.11a, 11b, 11g, or 11n. However, in the context of the invention, there is no particular requirement (1) that this particular communication standard is used, e.g., the wireless communication might be conducted according to a standard other than 802.11, or even according to an IEEE standard entirely, or (2) that all wireless stations each use the same standard or even use inter-compatible communication standards.

System Elements

FIG. 1 shows a conceptual diagram of an arrangement including multiple wireless communication systems, each possibly including either fixed wireless stations, mobile wireless stations, or both. Each AP 114A and 114B includes one or more wireless device operating within a communication range, and coupled to a wireless communication system. The wireless communication system might include a commonly known system such as the Internet, or might include one or more wireless communication systems separate therefrom. Access points 114A and 114B can provide communications using wireless communication links or wire-line communication links, with one or more wireless stations (which might be mobile or stationary, but which are sometimes referred to herein as "mobile stations") wireless stations 118. Each wireless station is coupled to one or more (typically only one) of the access points 114A or 114B according to the protocol inherent in the design of the wireless device, for example IEEE 802.11b, IEEE 802.11g or IEEE 802.11n. Selected wireless communication protocols might have distinct speeds, data rates, signal/noise ratios, or other parameters, used when exchanging data between one or more wireless stations 118 and access points 114 (R0-Rn).

Each wireless station 118 includes elements shown in the FIG. 1, including at least a device control circuit 120, and a transceiver comprised of a transmitter 122, and a receiver 124. In a first set of preferred embodiments, the device control circuit 120 includes a computing device capable of implementing one or more of the IEEE 802.11a, 11b, 11g, or 11n protocols, and includes one or more radios. One example of a wireless device might include a telephone or mobile computer capable of operating in a wireless environment. However, in the context of the invention, there is no particular requirement that the device control circuit 120 must be pre-programmed; it may instead include programmable memory, data memory, and optionally mass storage. One example of this distinct type of wireless device could be a mobile computer programmable to discover its wireless environment and operate therein.

Wireless stations make decisions regarding their communication in response to local information, such as for example (1) information about what AP's a wireless device can "hear," (that is, receive intelligible signals from), (2) information about one or more communication links and possible communication messages sent by AP's to the wireless device, and possibly otherwise. In systems with more than one AP, wireless stations might choose an AP with which to communicate in response to this information or other information.

Access Points

Each access point 114A and 114B includes elements at least as shown in the FIG. 1, including at least an AP control circuit 126 and a transceiver. The AP control circuit 126 includes a computing device, such as a processor, program and data memory, and optionally mass storage and other elements known to be used with computing devices. In cases in which a computing device included within the AP control circuit 126 is programmable, it might operate under control of software, such as possibly operating system software, application software, other software, or some combination or conjunction thereof.

Signal Strength Reduction

In operation each wireless station 118 connects to an access point 114A or 114B using a protocol in which it establishes communication. In the event a $1^{st}$ and $2^{nd}$ wireless communication systems are located sufficiently relatively close that they might interfere in operation, each wireless communication system, having no control over the AP's in the other such system, modifies parameters, such as a signal strength, of its own AP 114B, with the effect that its own AP 114B can operate below a threshold at which it might interfere with wireless communication signals in the other system.

This can be illustrated with a $1^{st}$ and a $2^{nd}$ wireless communication system. If the $2^{nd}$ wireless communication system identifies any interference with the $1^{st}$ wireless communication system, the $2^{nd}$ wireless communication system might direct its AP's to reduce their signal strength, or otherwise alter their communication parameters, with the effect that interference with the $1^{st}$ wireless communication system is substantially minimized. Concurrently, the $1^{st}$ wireless communication system, identifying interference with the $2^{nd}$ wireless communication system, might direct its own AP's to reduce their signal strength, or otherwise alter their communication parameters, with the effect that interference with the $2^{nd}$ wireless communication system is substantially minimized.

While this application is written to primarily describe changes in signal strength used by AP's in the $1^{st}$ and $2^{nd}$ wireless communication system, in the context of the invention, there is no particular requirement for any such limitation. For example and without limitation, the $1^{st}$ or $2^{nd}$ wireless communication systems might direct their AP's to use distinct coding schemes, such as using distinct communication frequencies, distinct CDMA encodings, distinct bit-per-symbol encodings, or other parameters, with the effect of reducing and thus relatively minimizing interference. After reading this application, those skilled in the art would recognize that the $1^{st}$ wireless communication system and the $2^{nd}$ wireless communication system need not alter the same parameters or even similar parameters, so long as interference is relatively reduced. For example and without limitation, the $1^{st}$ wireless communication system might reduce its inter-symbol transmission rate, while the $2^{nd}$ wireless communication system might increase the amount of bit-redundancy (such as for example, parity coding or other error-correction coding), with the effect that each of the $1^{st}$ and $2^{nd}$ wireless communication systems can be satisfied with a resultant degree of relative interference.

For example and without limitation, each of the $1^{st}$ and the $2^{nd}$ wireless communication system might simply treat signals from the other wireless communication system as noise, reducing its data transmission rate or taking other measures to maximize its communication throughput notwithstanding such artificial "noise". Those skilled in the art will recognize, after reading this application, that there are a wide variety of ways to ameliorate the effects of noise, within the scope of Shannon entropy. All such techniques, variants thereof, and combinations and conjunctions thereof, are within the scope and spirit of the invention.

Data Rate Reduction

Each AP in the second system determines how large the signal-to-noise ratio (SNR) is between itself and its assigned wireless stations in response to actual measures of SNR at various data rates. Information data rate is related to signal to noise by the approximation $$C=B \log_2(1+S/N)$$

where C=channel capacity,
B=bandwidth,
and S/N is the signal to noise ratio.

In one embodiment, each AP can determine actual measured SNR in response to the actual data rate, with the effect of determining parameters with which to calculate a predicted SNR in response to a predicted data rate. Each AP in the second system alters its protocol by lowering its signal strength (and thus, data rate) until the predicted SNR in the first system is low enough for the AP's in the first system to operate as well as the AP's in the second system.

Virtual Carrier Sense

An AP sends beacon message packets which include a clear-to-send (CTS) field for a selected sending device. The clear-to-send includes a duration value, indicating for how long the sender has control of the communication channel. This has the effect that other devices are signaled to not transmit anything for the duration value. For example, the beacon packet might last 200 microseconds, while the clear-to-send duration value might be as much as 10 milliseconds. This has the effect that all devices within range of the AP's beacon message packet are informed that the communication channel is occupied for that amount of time. Thus those devices should operate as if the communication channel is "in use" and not transmit over the channel.

However, devices in a second wireless communication system can determine that they are sufficiently distant from, or will be sufficiently unaffected by, signals from the first system. Accordingly, those devices in the second system can, subject to a threshold similar to techniques described under "Signal Strength Reduction" (above), disregard the duration value. This has the effect that devices in the second system can proceed with concurrent use of the communication channel as AP's from the first system. Moreover, devices in the second wireless communication system can set a third threshold with respect to beacon messages from AP's in the first system. Thus the devices in the second system can, if a beacon message packet from an AP in the first system is sufficiently low powered, disregard the control effect of that beacon message.

Computing the SNR

An AP in the second system, having determined that it has received a message packet from an AP in the first system, determines an SNR associated with message packets between itself and its own wireless stations. The second system AP guesses that the first system AP has a similar SNR between itself and its own wireless stations. This has the effect that the second system AP can calculate at what signal strength its own messages are interfering with the first system AP.

In one embodiment, the second system AP may maintain a table associating data rate with signal strength with the effect that the second system AP can estimate the SNR at the first system AP in response to the data rate the second system AP is using. If needed, the second system can calculate a regression line in response to these data, which allows the second system AP to approximate the SNR at the first system AP when the second system AP is using a given signal strength. Alternatively, the regression line calculation may be performed at a remote processor with the AP providing the necessary parameters. The remote processor may be coupled through the network or wirelessly through another device.

Computing the Second System Data Rate

The second system AP can compute, from the probable SNR at the first system AP, what ambient electromagnetic noise (or other forms of interference) is present, and therefore what level of attenuation most likely occurs between the first system AP and the second system AP. This has the effect that the second system AP can calculate the point where a signal strength is "too loud" and interferes with the first system AP. Thus to avoid interference, the second system AP would only transmit at or below that signal strength.

Multiple Threshold Levels

As noted above, the second system AP, and the second system wireless stations can maintain a set of threshold values for determining the degree of non-response they make in response to the first system AP. Some of these threshold values might include:

At a threshold $[\Delta_3]$, the second system AP can lower its signal strength to allow the first system AP to communicate with its wireless stations.

At a threshold $[\Delta_2]$, the second system devices can ignore the duration value in clear-to-send message packets from the first system AP.

At a threshold $[\Delta_1]$, the second system devices can ignore beacon message packets from the first system AP.

At a threshold $[\Delta_0]$, the second system devices can treat message packets from the first system devices as if they were not heard at all.

Method of Operation

Figure 2:
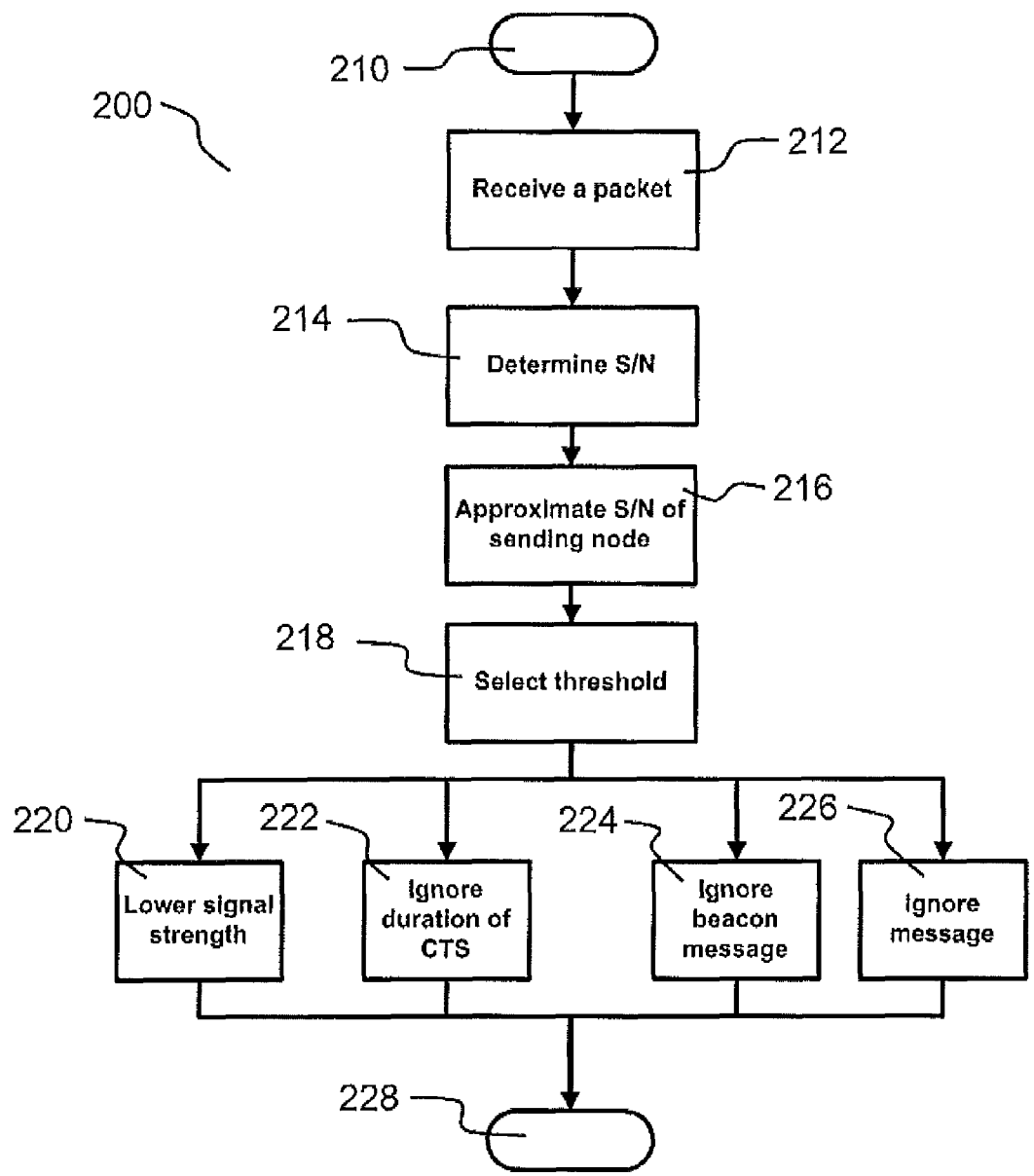
FIG. 2 is a conceptual diagram of a method 200 of operating wireless stations in close proximity.

FIG. 2 is a conceptual diagram of a method 200 of operating wireless stations in close proximity. At a flow label 210 the method begins and at a method step 212 a message packet is received. The message packet originates from an AP in close proximity to a receiving station operating according to the method 200. At a method step 214 the signal to noise ratio of the received signal is determined. The approximate signal to noise ratio of a signal received by the sender is determined at a method step 216. Once the signal to noise ratio is determined, the receiving station selects a threshold 218 to determine the appropriate degree of non-response to the received signal.

Selecting the degree of non-response provides for the method to choose one or more of the following method steps: lower the receiver's signal strength, ignore the duration of a broadcast or ignore the received message completely at method steps 220-226 respectively. Selecting a degree of non-response allows for the receiving station to operate with a minimized impact on the transmitting stations.

Additionally, the non-responsive selection can be transmitted to the transmitting station either through a direct wireless transmission or through an intermediary controller. This allows for propagation of signal strengths of various APs in a network. Access points configured to allow reception of signal strengths from neighboring APs provide for tuning a network to minimize overall collisions and latency problems.

ALTERNATIVE EMBODIMENTS

The invention has applicability and generality to other aspects of wireless communication, and is not limited to wireless communication based upon 802.11 standards. One having skill in the art will recognize that the systems and methods disclosed herein may be effectuated using other techniques. For example, the transmission time may be provided by the physical layer or data link layer to a higher level for determining the transmission time.

After reading this application, those skilled in the art would recognize that the scope and spirit of the invention includes other and further embodiments beyond the specifics of those disclosed herein, and that such other and further embodiments would not require new invention or undue experimentation.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

The invention claimed is:

1. A computer-implemented method at a first communication network for reducing interference between the first communication network and a second communication network, the method comprising:
   receiving message packets at a node in the first communication network;
   determining by the node whether the message packets originated from the second communication network, the second communication network being any external network located proximate to the first communication network;
   responsive to a determination that the message packets originated from the second communication network, modifying a parameter by the node to operate below a threshold in order to prevent interference by the first communication network on the second communication network;
   receiving a beacon message from the second communication network, the beacon comprising a clear-to-send (CTS) field with a duration value indicating how long a sender has control of a communication channel; and
   responsive to modifying the parameter below the threshold to prevent interference of the first communication network on the second communication network, ignoring the duration value of the CTS field.

2. The method of claim 1, wherein the second communication network is foreign to the first communication network.

3. The method of claim 1, wherein modifying the parameter comprises reducing a signal strength to operate below a threshold in order to prevent interference by the first communication network on the second communication network.

4. The method of claim 1, wherein modifying the parameter comprises reducing a data rate to operate below a threshold in order to prevent interference by the first communication network on the second communication network.

5. The method of claim 1, further comprising:
   determining an approximate signal-to-noise (SNR) ratio of the second communication network by using a measurement of the SNR ratio of a first node and a second node in the first communication network,
   wherein modifying the parameter comprises modifying the parameter to operate below an SNR threshold in order to prevent interference on the second network.

6. The method of claim 1, further comprising:
   determining an approximate signal-to-noise (SNR) ratio of the second communication network;
   receiving an amount of ambient electromagnetic noise between the first and second communication systems,
   wherein modifying the parameter comprises modifying the parameter to operate below an SNR threshold in order to prevent interference in view of the amount of ambient electromagnetic noise.

7. The method of claim 1, wherein the node comprises an access point.

8. A non-transitory computer readable medium storing instructions that, when executed by a processor, perform a method at a first communication network for reducing interference between the first communication network and a second communication network, the method comprising:
   receiving message packets at a node in the first communication network;
   determining by the node whether the message packets originated from the second communication network, the second communication network being any external network located proximate to the first communication network;
   responsive to a determination that the message packets originated from the second communication network, modifying a parameter by the node to operate below a threshold in order to prevent interference by the first communication network on the second communication network;
   receiving a beacon message from the second communication network, the beacon comprising a clear-to-send (CTS) field with a duration value indicating how long a sender has control of a communication channel; and
   responsive to modifying the parameter below the threshold to prevent interference of the first communication network on the second communication network, ignoring the duration value of the CTS field.

9. The computer readable medium of claim 8, wherein the second communication network is foreign to the first communication network.

10. The computer readable medium of claim 8, wherein modifying the parameter comprises reducing a signal strength to operate below a threshold in order to prevent interference by the first communication network on the second communication network.

11. The computer readable medium of claim 8, wherein modifying the parameter comprises reducing a data rate to operate below a threshold in order to prevent interference by the first communication network on the second communication network.

12. The computer readable medium of claim 8, further comprising:
   determining an approximate signal-to-noise (SNR) ratio of the second communication network by using a measurement of the SNR ratio of a first node and a second node in the first communication network,
   wherein modifying the parameter comprises modifying the parameter to operate below an SNR threshold in order to prevent interference on the second network.

13. The computer readable medium of claim 8, further comprising:

determining an approximate signal-to-noise (SNR) ratio of the second communication network;

receiving an amount of ambient electromagnetic noise between the first and second communication systems, wherein modifying the parameter comprises modifying the parameter to operate below an SNR threshold in order to prevent interference in view of the amount of ambient electromagnetic noise.

14. The computer readable medium of claim 8, wherein the node comprises an access point.

15. A node method at a first communication network for reducing interference between the first communication network and a second communication network, the node comprising:
  a processor; and
  a memory, comprising:
    a first module to receive message packets at a node in the first communication network;
    a second module to determine by the node whether the message packets originated from the second communication network, the second communication network being any external network located proximate to the first communication network;
    a third module to, responsive to a determination that the message packets originated from the second communication network, modify a parameter by the node to operate below a threshold in order to prevent interference by the first communication network on the second communication network;
    a fourth module to receive a beacon message from the second communication network, the beacon comprising a clear-to-send (CTS) field with a duration value indicating how long a sender has control of a communication channel; and
    a fifth module to, responsive to modifying the parameter below the threshold to prevent interference of the first communication network on the second communication network, ignore the duration value of the CTS field.

* * * * *